Oct. 24, 1950 H. A. BROWNE ET AL 2,527,394
SIDE TAKE-OFF FOR AIR CONVEYERS
Filed April 5, 1949 2 Sheets-Sheet 1
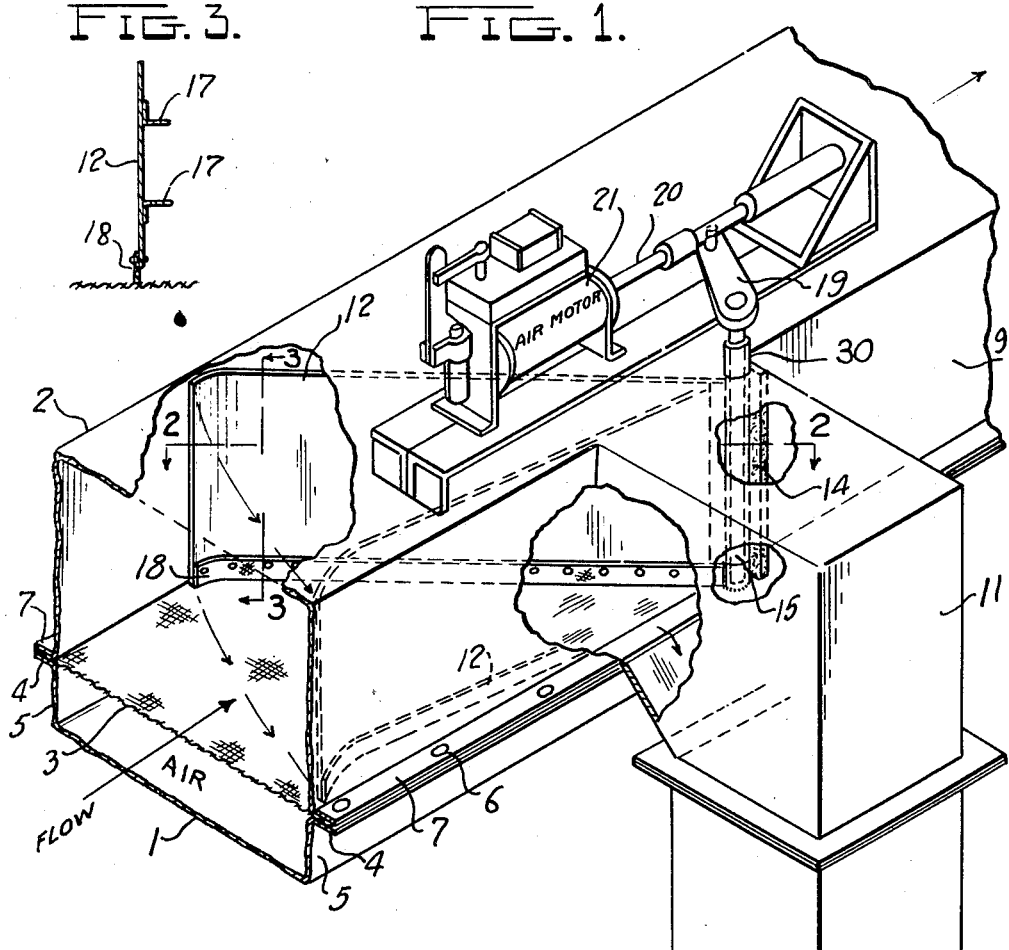
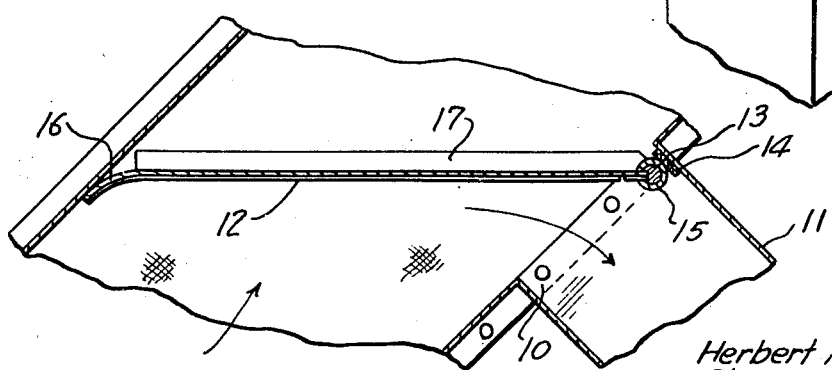
INVENTORS.
Herbert A. Browne &
BY Clarence W. Shea
Barnes, Kisselle, Laughlin & Raisch
ATTORNEYS Oct. 24, 1950     H. A. BROWNE ET AL     2,527,394
SIDE TAKE-OFF FOR AIR CONVEYERS
Filed April 5, 1949     2 Sheets-Sheet 2
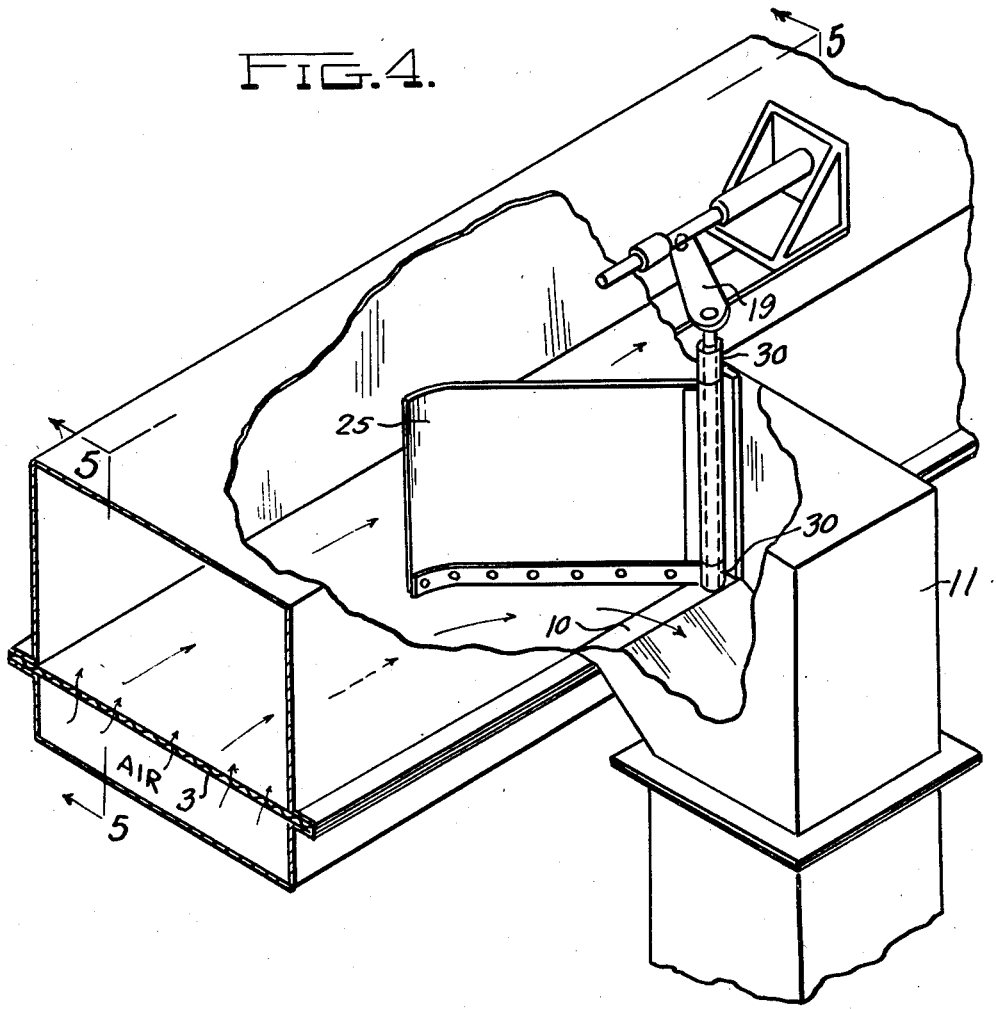
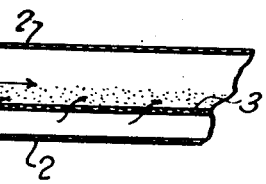
INVENTORS
Herbert A. Browne &
Clarence W. Shea
BY
Barnes, Kisselle, Laughlin & Raisch
ATTORNEYS Patented Oct. 24, 1950

2,527,394

UNITED STATES PATENT OFFICE 2,527,394

SIDE TAKE-OFF FOR AIR CONVEYERS

Herbert A. Browne and Clarence W. Shea, Alpena, Mich., assignors to Huron Portland Cement Company, Detroit, Mich., a corporation of Michigan Application April 5, 1949, Serial No. 85,593

9 Claims. (Cl. 309—29)

This invention relates to a take-off for an air conveyor.

Air conveyors are now in use for transporting fine pulverulent dry material. Such an air conveyor comprises an inclined porous medium which supports a stream of pulverulent material which is aerated, so that it has somewhat the characteristics of a fluid, by low pressure air passing through the porous medium and the aerated material flows down the inclined porous support due to gravity. Such an air conveyor is shown in the copending application of Henry Ripley Schemm, Serial No. 602,004, filed June 28, 1945, now abandoned. Such air conveyors are utilized to convey numerous finely divided materials such as cement, soda ash, bentonite, lime, and the raw materials from which Portland cement is compounded. It is often highly desirable in the use of an air conveyor to divert all or part of the stream of pulverulent material from the conveyor.

It is an object of this invention to produce a take-off for an air conveyor which is of simple structure, efficient in operation, simple to install in the conveyor line, easy to operate, and substantially trouble-free in operation.

Fig. 1 is a perspective view showing my take-off.

Fig. 2 is a section along the line 2—2 of Fig. 1.

Fig. 3 is a section along the line 3—3 of Fig. 1.

Fig. 4 is a perspective view showing a modified form of take-off for diverting only a portion of the stream of pulverulent material from the air conveyor.

Fig. 5 is a section along the line 5—5 of Fig. 4.

Referring more particularly to the drawings it will be seen that my take-off comprises a housing in the form of metal channels 1 and 2. A porous medium 3 extends across channel 1 throughout its length and rests upon the outwardly turned flanges 4 of the side walls 5 of the channel. The upper channel 2 is inverted and positioned upon the porous medium 3 and bolted thereto by bolts 6 which pass through the flanges 7 and 4 and the intervening edges of the porous medium 3.

Porous medium 3 can be made of porous filter stone but preferably takes the form of any low permeability woven fabric material, woven, e. g., from cotton or other fibers or from spun glass. Finely woven, heavy canvas belting is especially advantageous as a porous medium. Such canvas belting is usually a woven multiple ply belting and is usually designated commercially by the number of plies it contains. Multiple ply woven canvas belting having, for example, any number of plies is preferred from two to eight plies.

Low pressure air can be supplied to channel 1 beneath fabric 3 anywhere along its length by means of an ordinary fan or blower 8, Fig. 5.

By "low pressure air" we mean air at a static pressure in the neighborhood of two to sixteen inches water guage but in some instances, depending upon the head of material in the conveyor, this pressure will run as high as two and one-half pounds per square inch. The permeability of the porous fabric will be such that at the low pressures above indicated it will pass from two to twelve cubic feet per minute of air through each square foot of area. We have found the canvas belting to be exceptionally efficient where it passes about two to four cubic feet per minute of air per square foot of canvas at a static pressure in the neighborhood of two to eight inches water gauge. The air flowing through the porous medium 3 aerates the pulverulent material which may take the form, for example, of dry powdered cement, mortar, cereal, flour or powdered plastic.

The porous medium 3 is planar in form and is inclined preferably at an angle slightly greater than the angle of repose of the aerated material. The flow of material is indicated by the arrow and the optimum angle of inclination to the horizontal for the conveyor is about five degrees.

Side wall 9 of channel 2 is provided with an opening 10 into which is connected a branch tubular duct 11. For diverting the aerated stream of powdered material from the air conveyor into branch duct 11 there is provided a blade 12 which is fixed at one end upon vertical shaft 13 which is journaled along one of the side vertical edges of opening 10 in bearings 30. A felt seal 14 is positioned between the hinged edge 15 of blade 12 and the adjacent side wall of duct 11 to avoid any powdered material flowing between the hinged edge 15 of the blade and the adjacent side wall of the duct 11. The outer end 16 of blade 12 is curved. Blade 12, which is made from thin gauge sheet steel, is stiffened by a pair of angle irons 17 which are welded, riveted, or otherwise secured thereto.

The lower edge of blade 12 is provided with a seal or squeegee in the form of a strip of rubber 18 or other flexible material such as a strip of canvas belting preferably of the same material as porous web 3. The blade 12 is shown in the closed position, dotted lines, Fig. 1, and in the wide open position in the full lines. Since blade 12 has substantially the same height as the channel 2, when blade 12 is closed the blade closes opening 10 so that the powdered material will not be diverted but will flow by opening 10. When blade 12 is swung to open position the stream of powdered material upon striking blade 12 is diverted at an angle of about forty-five degrees across porous medium 3 and into duct 11, as indicated by the arrows. In swinging to open and closed position squeegee or seal 18 contacts and slides across fabric 3 so that the metal blade 12 does not touch the fabric.

Blade 12 can be hand operated but preferably is power operated and for this purpose shaft 13, to which blade 12 is affixed so that it will turn with shaft 13, is provided with a crank arm 19 the outer end of which is pivotally connected to the piston rod 20 which is connected to the piston (not shown) within the cylinder 21 of a compressed air actuated motor.

Blade 12 is preferably but not necessarily actuated so that it is either fully openend, full line showing Fig. 1, or fully closed, dotted line showing. For diverting a portion of the aerated stream of powdered material into duct 11 there is preferably provided a modified form of blade 25 which is similar in all respects to blade 12 except that it is only about half as long and extends in wide open position only half way across fabric 3. Blade 25 is pivotally supported and actuated in identically the same manner as blade 12.

To divert a portion of the aerated material into duct 11, blade 25 is swung preferably at an angle of about forty-five degrees across the stream of powdered material whereupon a portion of the powdered material is diverted into duct 11 and the remaining portion continues on as indicated by the arrows. In closed position blade 25, like blade 12, seals off opening 10.

Our take-off can be fabricated so that the channels 1 and 2 and the intervening porous medium 3 are an integral part of the air conveyor duct or our take-off can be fabricated as a separate unit, as shown in Figs. 1 and 4, and the housing 1, 2, intervening fabric 3, and blade assembly 12 assembled as a unit into the air conveyor.

We claim:

1. A material take-off for an air conveyor adapted to convey aerated pulverulent material comprising in combination a porous support for said material inclined at least at the angle of repose of the aerated material being conveyed, said porous support having a gaspermeability such that from about 2 to 4 cubic feet per minute of air per square foot of area will pass therethrough at a static pressure below the porous medium of from 2 to 8 inches water gauge, a plenum chamber beneath said porous support containing gas under pressure which flows upwardly through said porous medium to aerate the pulverulent material flowing downwardly thereon, side walls for confining the stream of aerated material upon the porous support, an opening in one of said side walls, and a blade arranged to be positioned at an angle across said porous support to divert at least a part of the stream of aerated material through said opening.

2. The material take-off claimed in claim 1 wherein the said blade is hinged upon a vertical hinge at the downstream edge of said opening and is swingable from a position across said opening where the blade closes said opening to a position across said porous support wherein the blade diverts at least a portion of said stream of pulverulent material through said opening.

3. The material take-off claimed in claim 2 wherein the said blade is longer than the width of said porous support whereby in wide open position said blade extends across the support at an angle substantially less than a right angle.

4. The material take-off claimed in claim 3 including a top wall extending across said side walls and wherein said blade has a height substantially equal to the height of said side walls.

5. The material take-off claimed in claim 4 wherein the lower edge of said blade is provided with a flexible seal which slides across the porous support in the opening and closing of said blade.

6. A material take-off for an air conveyor adapted to convey aerated pulverulent material comprising in combination a porous support for said material inclined at least at the angle of repose of the aerated material being conveyed, said porous support having a gas-permeability such that from about 2 to 4 cubic feet per minute of air per square foot of area will pass therethrough at a static pressure below the porous medium of from 2 to 8 inches water gauge, a plenum chamber beneath said porous support containing gas under pressure which flows upwardly through said porous medium to aerate the pulverulent material flowing downwardly thereon, side walls for confining the stream of aerated material upon the porous support, an opening in one of said side walls, and a blade hinged along the vertical downstream edge of said opening and having a length relative to the width of said porous support whereby when the blade is swung at an angle less than a right angle across said porous support the free edge of said blade will be spaced from the opposite side wall whereby only a portion of the stream of pulverulent material will be diverted into said opening.

7. A material take-off for an air conveyor adapted to convey aerated pulverulent material comprising in combination a web of tightly woven fabric for said material inclined at least at the angle of repose of the aerated material being conveyed, said tightly woven fabric having a gas-permeability such that from about 2 to 4 cubic feet per minute of air per square foot of area will pass therethrough at a static pressure below the tightly woven fabric of from 2 to 8 inches water gauge, a plenum chamber beneath said web containing gas under pressure which flows upwardly through said web to aerate the pulverulent material flowing downwardly thereon, side walls for confining the stream of aerated material upon the web, an opening in one of said side walls, and a blade arranged to be positioned at an angle across said web to divert at least a part of the stream of aerated material through said opening.

8. The material take-off claimed in claim 7 wherein the said blade is hinged upon a vertical hinge at the downstream edge of said opening and is swingable from a position across said opening where the blade closes said opening to a position across said porous support wherein the blade diverts at least a portion of said stream of pulverulent material through said opening.

9. The material take-off claimed in claim 8 wherein the web is in the form of multiple ply canvas belting.

HERBERT A. BROWNE.
CLARENCE W. SHEA.

REFERENCES CITED

The following references are of record in the file of this patent:

UNITED STATES PATENTS

| Number | Name | Date |
|---|---|---|
| 1,941,429 | Berger | Dec. 26, 1933 |
| 2,219,283 | Horn | Oct. 29, 1940 |
| 2,316,814 | Schemm | Apr. 20, 1943 |
| 2,396,524 | Nettel | Mar. 12, 1946 |